United States Patent
Swan et al.

(10) Patent No.: US 7,649,848 B1
(45) Date of Patent: Jan. 19, 2010

(54) ABILITY TO APPLY DIFFERENT LEVELS OF QUALITY OF SERVICE (QOS) TO DIFFERENT SESSIONS IN AN IPSEC TUNNEL

(75) Inventors: Tim L. Swan, Lee's Summit, MO (US); David Uel McKinney, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 610 days.

(21) Appl. No.: 11/530,176

(22) Filed: Sep. 8, 2006

(51) Int. Cl.
*H04J 1/16* (2006.01)
*H04J 3/16* (2006.01)
*H04L 12/28* (2006.01)

(52) U.S. Cl. ............... 370/252; 370/389; 370/468
(58) Field of Classification Search ............ 370/230, 370/252–254, 389, 392, 395.2, 395.21, 400, 370/401, 468
See application file for complete search history.

(56) References Cited

U.S. PATENT DOCUMENTS

| | | | |
|---|---|---|---|
| 6,570,855 B1 | 5/2003 | Kung et al. | |
| 6,798,745 B1 | 9/2004 | Feinberg | |
| 7,095,715 B2 * | 8/2006 | Buckman et al. | 370/230 |
| 7,436,843 B2 | 10/2008 | Gustafsson et al. | |
| 7,444,398 B1 | 10/2008 | Matthews | |
| 7,508,785 B2 | 3/2009 | Dale et al. | |
| 7,536,548 B1 * | 5/2009 | Batke et al. | 713/166 |
| 2007/0064673 A1 | 3/2007 | Bhandaru et al. | |
| 2007/0133803 A1 * | 6/2007 | Saito et al. | 380/267 |
| 2008/0019370 A1 | 1/2008 | Riley | |
| 2008/0080509 A1 * | 4/2008 | Khanna et al. | 370/392 |
| 2008/0092229 A1 * | 4/2008 | Khanna et al. | 726/15 |
| 2008/0101598 A1 * | 5/2008 | Dillaway | 380/44 |

OTHER PUBLICATIONS

Non-Final Office Action mailed Apr. 10, 2009 in U.S. Appl. No. 11/530,154.
Non-Final Office Action mailed Apr. 27, 2009 in U.S. Appl. No. 11/530,191.
Ghosh, Mobile IP, Nov. 1, 2001, ACM, all pages.
Hardwick, Session Border Controllers: Enabling the VoIP Revolution, Feb. 2005, DataConnnection, all pages.

* cited by examiner

*Primary Examiner*—Hong Cho

(57) ABSTRACT

Quality of Service (QoS) is provided to a secure data tunnel such an IPsec tunnel using information about the tunnel and the underlying data session to formulate a set of bandwidth requirements. A policy server operates to receive the information to create the set of bandwidth requirements which are enforced by a termination device. The termination device sets the bandwidths. QoS can be provided on a static or continuous basis. QoS can be provided on a dynamic basis. QoS can be provided at different levels depending on the type of data session. Multiple QoS can be provided for multiple data sessions existing simultaneously using multiple SSIDs.

39 Claims, 11 Drawing Sheets

ABILITY TO APPLY DIFFERENT LEVELS OF QUALITY OF SERVICE (QOS) TO DIFFERENT SESSIONS IN AN IPSEC TUNNEL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Cellular and WiFi networks have sometimes been seen as competitors, primarily in the wireless data market. However, they may be viewed as complementary services or even as a way to enhance coverage. Coverage continues to be a key reason cellular customers complain and switch service providers. Recently, wireless usage has increased due to competitive pricing and new entrants within the telecommunications industry.

In the context of this specification, the term cellular is used to denote wireless networks and services associated with 1G, 2G, 2.5G, 3G, and 4G networks such as CDMA, TDMA, GSM, UMTS, and others. The term cellular is also used to distinguish one form of wireless networks from other wireless networks such as WiFi. WiFi denotes IEEE 802.11 wireless networks.

Service providers that offer wireless services have increased the number of minutes included in voice plans and encouraged customers to "cut the cord" by moving away from their local exchange carrier to an all-cellular service for their mobile and in-home voice services. Programs that entice customers with free long distance service and unlimited usage plans on weekends and after 7 p.m. have clearly driven in-home usage of cellular voice services.

At the same time of cellular service increases, there has been a rapid growth of WLAN (Wireless Local Area Network) deployments within enterprises, hotspots, and homes, along with improvements in VoIP over WLAN access to provide high-quality voice service. Now, combined with the introduction of dual-mode handsets (Combo Phones) that can support both cellular (GSM, UMTS or CDMA) and WLAN, new market opportunities for service providers are being created. The ability of service providers to deliver a comprehensive, high quality voice service that converges a mobile and fixed-line infrastructure is considered a compelling product differentiator.

One way in which to capitalize on the convergence of mobile and fixed-line infrastructures is to develop a strategy for combining CDMA and WiFi networks, or combining any cellular and WLAN networks. This strategy would leverage customers with existing broadband data access for backhaul and WiFi access networks primarily within residential homes and small businesses. Providing consumers with a nationwide, competitive, mobile service along with in-building quality that is on par with traditional wireline voice services opens a new market opportunity.

The offering of combining various wireless networks has led to the use of an industry-wide term, fixed mobile convergence (FMC). FMC is used to describe the combination of WiFi and Cellular into a mobile handset. Various manufacturers and service providers are developing a dual band mobile handset or endpoint device to provide combined WiFi and cellular services. In addition, some service providers are combining the WiFi/cellular services with cable broadband services.

The offering of combined WiFi/cellular services presents some problems. One of the problems is that although cellular networks are typically secure, WiFi and similar networks are typically not secure. The cellular networks have reliable encryption capabilities that allow telephone calls and other services to traverse the cellular network between two end-point devices. In many cases, this encryption is proprietary and provides a secure network. On the contrary, WiFi networks tend to provide an open access with relatively little or no security. There are no assurances for privacy for a call traversing a WiFi network. In addition, a service provider has little or no control over a telephone call or data session after it leaves a cellular network and enters into a WiFi network.

The Data Over Cable Service Interface Specification (DOCSIS®) standard defines interface requirements for cable modems (CM) and eMTAs (multimedia terminal adapters with embedded CM) for the customer premise equipment used for high-speed data distribution over cable television system networks. The inability to provide a level of QoS within the DOCSIS access network is a limitation. Without QoS within the cable access network all traffic will have to contend with existing data traffic including FTP, streaming media, e-mail, gaming applications and other emerging Internet applications competing for their share of bandwidth. VOP services require strict levels of QoS in order to perform on par with circuit-switched voice services. Voice traffic has two critical required characteristics, very low delay and very low jitter. Please note that VOP can include such technologies as VoATM, VoIP, VoWLAN, to name a few.

Interactive voice conversations must have low delay. The maximum acceptable delay is about 150 ms from ear to ear. Unfortunately, there are limits on what can be done in the network to reduce delay, especially when VOP services compete with typical IP data services for network resources. Development of the packet cable standards has provided cable service providers, known as MSOs, the ability to deliver a superior VOP service which leverages QoS in the DOCSIS network.

DOCSIS networks are configured to deliver shared bandwidth to broadband cable customers and are over subscribed by MSOs to gain network efficiencies. Developing packet cable and packet cable multimedia (PCMM) standards which can provide dynamic QoS triggers to the DOCSIS network-based service flows (types of data traffic) is key to creating high quality latency and jitter sensitive applications like voice, multimedia and IP video.

As a result of the envisioned problems, a solution is needed that allows customers to access multiple wireless networks in a data session including cellular and WiFi while also providing security of the data session. The solution should provide security of the data session when it is initiated, terminated, or transited through open access networks such as WLAN and in particular WiFi. More specifically, the data session should receive quality of service (QoS) when traversing through the open access network in order to maintain specific qualities that are received in cellular or circuit-switched networks.

SUMMARY

The present invention is defined by the claims below. Embodiments of the present invention solve at least the above problems by providing a system, method, and media for, among other things, applying different levels of quality of service (QoS) to different data sessions in a secure data tunnel.

In a first aspect, a computer system having a processor and a memory to execute a method for dynamically providing different levels of QoS to different data sessions in a secure data tunnel in networks is provided that includes establishing the secure data tunnel between an endpoint device and a home agent. At the home agent, a first information set is received associated with the secure data tunnel. A data type for a data session in the secure data tunnel is determined at the home agent. The first information set, a second information set, and the data type are provided to a policy server. An indication is received at a session border controller of the data session in the secure data tunnel. The session border controller provides at least one of a codec information and an IP address of the endpoint device to the policy server. With the first information set, the second information set, the data type, and at least one of the codec information and the IP address of the endpoint device, bandwidth requirements are determined from policies based in the policy server. The bandwidth requirements are provided to at least one of another policy server and a termination device. The another policy server communicates with the termination device when the another policy server receives the bandwidth requirements. The termination device establishes bandwidths for the secure data tunnel.

In another aspect, a computer system having a processor and a memory to execute a method for dynamically providing different levels of QoS to different data sessions in a secure data tunnel networks is provided that includes establishing the secure data tunnel between an endpoint device and a home agent. A first information set associated with the secure data tunnel is received at the home agent. The first information set and a second information set are provided to a policy server. An indication is received at a session border controller of a data session in the secure data tunnel. The session border controller provides at least one of a codec information and an IP address of the endpoint device to the policy server. A data type for the data session in the secure data tunnel is determined at the session border controller. With the first information set, the second information set, the data type, and at least one of the codec information and the IP address of the endpoint device, bandwidth requirements are determined from policies based in the policy server. Bandwidth requirements are provided to at least one of another policy server and a termination device. The another policy server communicates with the termination device when the another policy server receives the bandwidth requirements. The termination device establishes bandwidths for the secure data tunnel.

In yet another aspect, a system for dynamically providing different levels of QoS to different data sessions in a VPN in networks is provided that includes a home agent, a session border controller, a policy server, and at least one of another policy server and a termination device operating together in the networks. The home agent operates to receive a first data set associated with the data session in the VPN, and to provide to the policy server at least one of the first data set and a second data set associated with the home agent. The session border controller operates to receive an indication of the data session and to provide at least one of a codec information and an IP address associated with an endpoint device initiating the data session to the policy server. Either the home agent operates to determine a data type for the data session and to provide the data type to the policy server, or the session border controller operates to determine the data type for the data session and to provide the data type to the policy server. The policy server operates to receive at least one of the first data set, the second data set, and the data type, to monitor for the codec information and the IP address from the session border controller, and to provide at least one of an upstream bandwidth requirement and a downstream bandwidth requirement to at least one of the another policy server and the termination device. Upon a receipt of the codec information and the IP address, the policy server correlates the codec information, the IP address, the data type, the first data set, and the second data set for the VPN and the data session. Either the another policy server operates to receive at least one of the upstream bandwidth requirement and the downstream bandwidth requirement, and to communicate at least one of the upstream bandwidth requirement and the downstream bandwidth requirement to the termination device, or the termination device operates to receive at least one of the upstream bandwidth requirement and the downstream bandwidth requirement.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
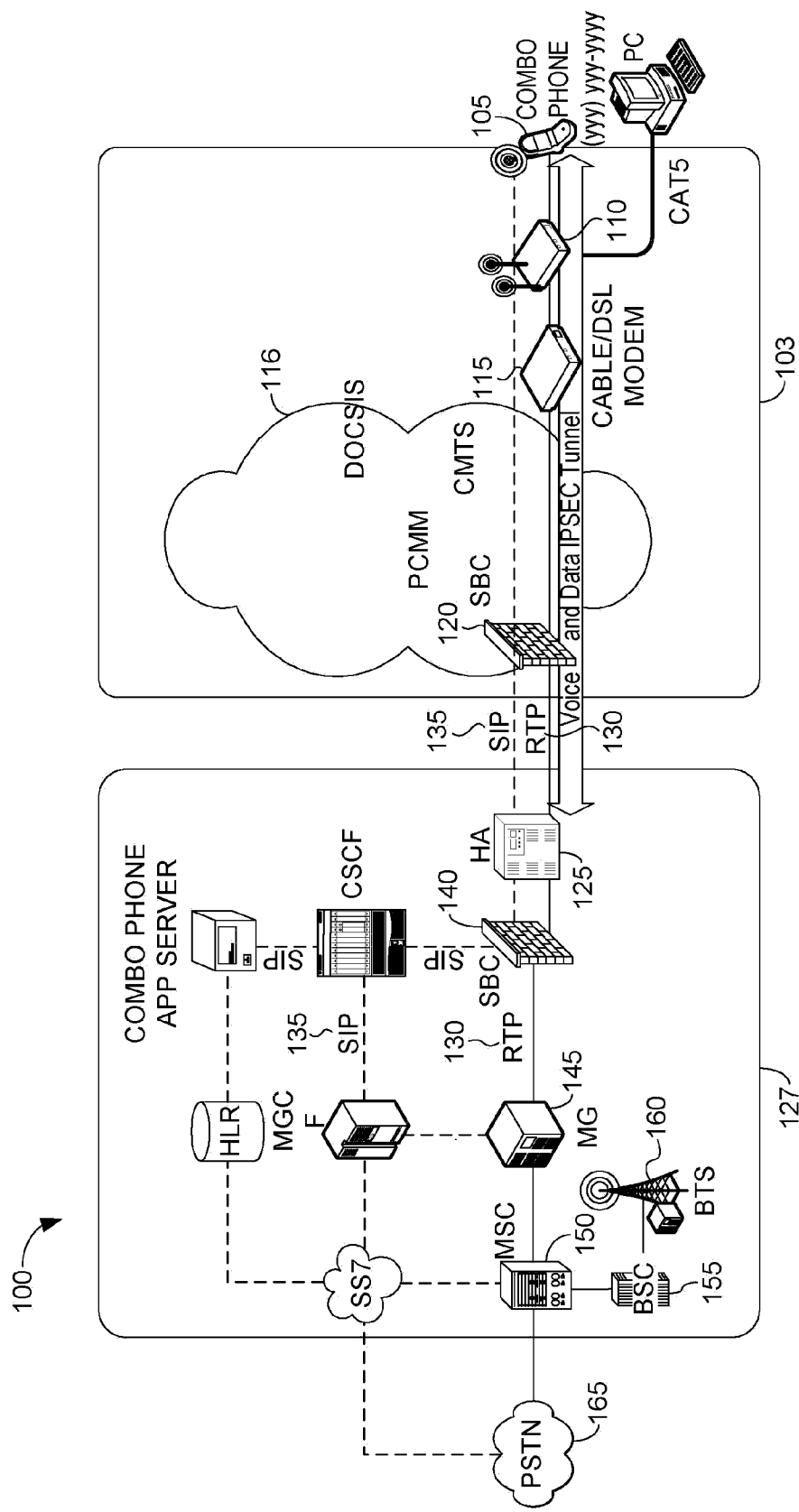
FIG. 1 is a block diagram of an exemplary operating network with two service providers.

Embodiments of the present invention provide systems, methods, and media for applying different levels of quality of service (QoS) to different data sessions in a secure data tunnel.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 2G | Second Generation Wireless Network |
| 3G | Third Generation Wireless Network |
| 4G | Fourth Generation Wireless Network |
| AM | Application Manager |
| AP | Access Point |
| AS | Application Server |
| BSC | Base Station Controller |
| BTS | Base Transceiver Station |
| CAC | Call Admission Control |
| CDMA | Code Division Multiple Access |
| CM | Cable Modem |
| CMTS | Cable Modem Termination System |
| COPS | Common Open Policy Service |
| CP | Combo Phone |
| CSCF | Call session Control Function |
| DOCSIS | Data Over Cable Service Interface Specification |
| DSLAM | Digital Subscriber Line Access Multiplexer |
| EDGE | Enhance Data Rates for GSM (and TDMA) Evolution |
| EV-DO | Evolution Data Only or Evolution Data Optimized |
| EEPROM | Electrically Erasable Read-Only Memory |
| eMTA | Embedded Multimedia Terminal Adapter |
| FMC | Fixed Mobile Convergence |
| GPRS | General Packet Radio Services |
| GSM | Global System for Mobile communication |
| HA | Home Agent |
| HFC | Hybrid Fiber Coax |
| IEEE | Institute of Electrical and Electronics Engineers |
| IKE | Internet Exchange Key |
| IETF | Internet Engineering Task Force |
| IP | Internet Protocol |
| IPsec | Internet Protocol Security |
| Kbs | Kilobits Per Second |
| L2TP | Layer 2 Tunnel Protocol |
| LAN | Local Area Network |
| Mbs | Megabits Per Second |
| MG | Media Gateway |
| MGC | Media Gateway Controller |
| MIP | Mobile Internet |
| MSC | Mobile Switching Center |
| MSO | Multiple System Operator |
| MTA | Multimedia Terminal Adapter |
| NAT | Network Address Translation |
| PC | Personal Computer |
| PCMM | PacketCable MultiMedia |
| PDA | Personal Digital Assistant |
| PSTN | Public Switched Telephone Network |
| QoS | Quality of Service |
| RF | Radio Frequency |
| RTP | Real Time Transport Protocol |
| SBC | Session Border Control |
| SIP | Session Initiation Protocol |
| SS7 | Signaling System 7 |
| SSID | Service Set Identifier |
| SSL | Secure Sockets Layer |
| TDMA | Time Division Multiple Access |
| TLS | Transport Layer Security |
| TOS | Type of Service |
| UDP | User Datagram Protocol |
| UMTS | Universal Mobile Telecommunications Service |
| VoATM | Voice over Asynchronous Transfer Mode |
| VoIP | Voice over Internet Protocol |
| VOP | Voice over Packet |
| VoWLAN | Voice over Wireless Local Area Network |
| VPN | Virtual Private Network |
| WAN | Wide Area Network |
| W-CDMA | Wide Code Division Multiple Access |
| WiFi | Wireless Fidelity (802.11) |
| WLAN | Wireless LAN |
| WiMAX | Worldwide Interoperability for Wireless Access (802.16 network) |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

QoS in a Secure Tunnel

An embodiment of the present invention leverages the existing PCMM capability to enable QoS for the traffic in a MSO network configuration. The most challenging technical hurdle is that traffic traverses the DOCSIS network within a secure data tunnel such as IPsec which means that traffic cannot be shaped using existing PCMM methods. The secure data tunnel is a framework for a set of protocols for security at the network or packet processing layer of the network. IPsec is said to be especially useful for implementing virtual private networks and remote user access to networks requiring high levels of security. This security will be critical as the services move into public hot spot (WiFi) networks where the service provider has little to no control over security in the access network. The ability to provide dynamic QoS over a secure link provides an efficient use of the broadband DOCSIS network while maintaining a high quality voice service.

Embodiments of the present invention are designed to maintain the current IPsec configuration and leverage the packet cable infrastructure. An implementation of an embodiment of the present invention may require the addition of a PCMM policy server function within a network which is common to MSOs. In addition, a new interface between the home agent infrastructure and the PCMM policy server may be implemented. An implementation of an embodiment of the present invention can dynamically enable and disable QoS within an access network while maintaining the secure data tunnel for security purposes.

Embodiments of the present invention can leverage many of the existing capabilities such as DOCSIS, packet cable capabilities, cable modem, cable modem termination systems (CMTS), and policy servers which may be found in MSO networks, and mobile IP, WLAN, IPsec, and VOP which may be found in MSO and other networks. Embodiments of the present invention may include revisions to the home agent (HA), session border controller (SBC), and the PCMM policy server (also known as a PCMM compliant policy server).

DOCSIS is a standard interface for cable modems, the devices that handle incoming and outgoing data signals between a cable television service provider (MSO) and a personal or business computer or television set. DOCSIS specifies modulation schemes and protocols for exchanging bidirectional signals over cable. It supports downstream-to-the-user data rates up to 27 megabits per second (Mbps). Since this data rate is shared by a number of users and because cable service providers can be limited by a T1 connection to the Internet, the downstream data rate to an individual business or home can be more like 1.5 to 3 Mbps. Since the upstream data flow has to support much smaller amounts of data from the user, the upstream is designed for an aggregate data rate of 10 Mbps with individual data rates between 500 kilobits per second (Kbs) and 2.5 Mbps. Shared bandwidth and limited upstream bandwidth can have a negative impact on the ability to provide consistent voice services.

PCMM defines QoS and accounting capabilities that service providers can use to offer a wide variety of enhanced IP-based multimedia services and applications, including voice, video and interactive games, over DOCSIS networks. Service providers can use PCMM to apply QoS to Session Initiation Protocol (SIP) voice services, the technology favored by many VOP service providers, and video telephony. PCMM controls and activates the DOCSIS QoS for some multimedia applications. PCMM helps service providers deliver applications over broadband networks with the appropriate QoS needed for specific applications.

In FIG. 1, an exemplary operating environment of two service providers is shown in 100 where a data session may originate in one network and terminate in another network. In 100 and throughout the specification, the service provider may be any provider of data packet services including VOP and multimedia to name few. In 100, one service provider represents a telecommunications provider and the other service provider represents a cable operator.

In 100, CP 105 connects to an access point 110 which connects to modem 115 in cable operator network 103. Modem 115 connects to various equipments, systems, standards, and sub-networks such as DOCSIS, PCMM, and CMTS in 116 in network 103. When a user turns on CP 105, a secure data tunnel 117 is created through the previously mentioned devices through an SBC 120 into an HA 125 in telecommunications provider 127's network. Secure data tunnel 117 may include various VPNs including IPsec, L2TP, SSL, and TLS to name a few. Secure data tunnel 117 represents the transfer of encapsulated data packets at one or more layers.

Within tunnel 117, a data session can occur represented by RTP 130 and SIP 135. RTP 130 enters HA 125 and continues through SBC 140 into other devices within provider 127's network to terminate at an endpoint device. Although not shown, the endpoint device can be a telephone, mobile phone, computing device, or any other terminating equipment capable of communicating across networks. The endpoint device can exist in a packet environment or a circuit-switched environment. SIP 135, which represents a SIP session, can traverse provider 127's network through various equipment including media gateways to terminate at an appropriate device that can handle a SIP session.

As shown in FIG. 1, a telephone call, which is a type of data session, can originate at CP 105 in network 103 and terminate in provider 127's network. As a mean for providing security for the telephone call, an embodiment of the present invention creates tunnel 117 to secure the data packets. Once the telephone call goes beyond HA 125, other mechanisms can provide security for the telephone call. For example, if the telephone call continues through media gateway 145 in a circuit-based environment, the encryption protocols provided by the circuit-based technologies can handle the security. In 100, circuit-based equipment would include MSC 150, BSC 155, BTS 160, and PSTN 165. The telephone call can originate and terminate across secure domains. The reverse is possible as well. CP 150 can terminate a telephone call using tunnel 117.

Figure 2:
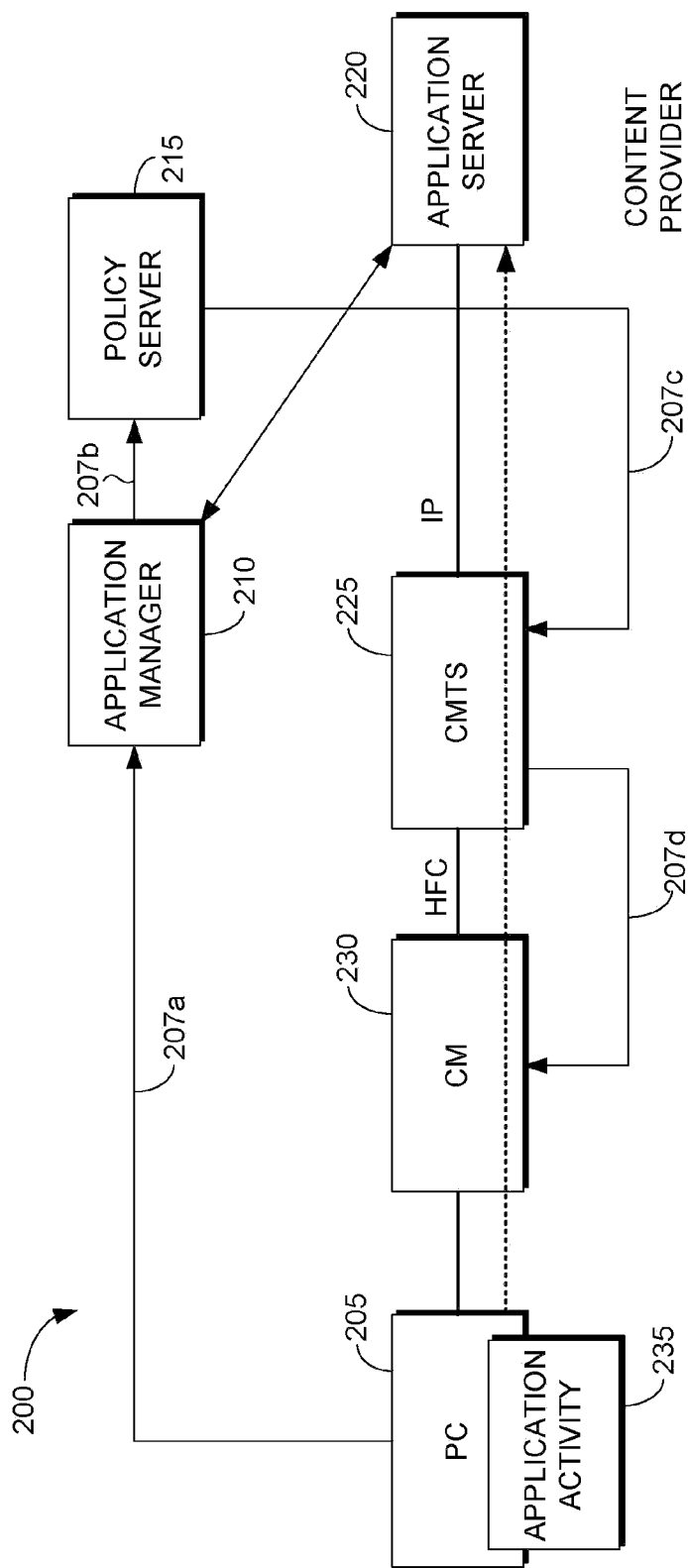
FIG. 2 is a block diagram of an exemplary PCMM specifications implemented in an embodiment of the present invention.

To provide more details about network 103 in FIG. 1 and in particular 116, FIG. 2 discusses service flows that occurs in the DOCSIS network. Although DOCSIS is used, the present invention is not limited to this standard or system. Other standards, systems, and protocols may be used to implement other embodiments of the present invention.

In FIG. 2, application manager 210 authenticates and authorizes a subscriber to use and convert personal computer application sessions 205 into resource requests 207a by signaling to a policy server 215 that understands the business rules for the cable operator. Policy server 215 signals a termination system such as a cable modem termination system (CMTS) 225 to enforce DOCSIS service flows 207a, 207b, 207c, and 207d. Policy requests 207b are sent to policy server 215. Policies 207c are sent to CMTS 225. The content provided by application server 220 traverses through CMTS 225 impacted by implemented policies 207c. For example, if the polices 207c shape the bandwidth channel for the transfer of data, the results (reshaping of the channel) is implemented by CMTS 225. CMTS 225 communicates to cable modem (CM) 230 through to personal computer application sessions 205 also known as an endpoint device. Application activity 235 represents the content delivered from application server 220.

Figure 3:
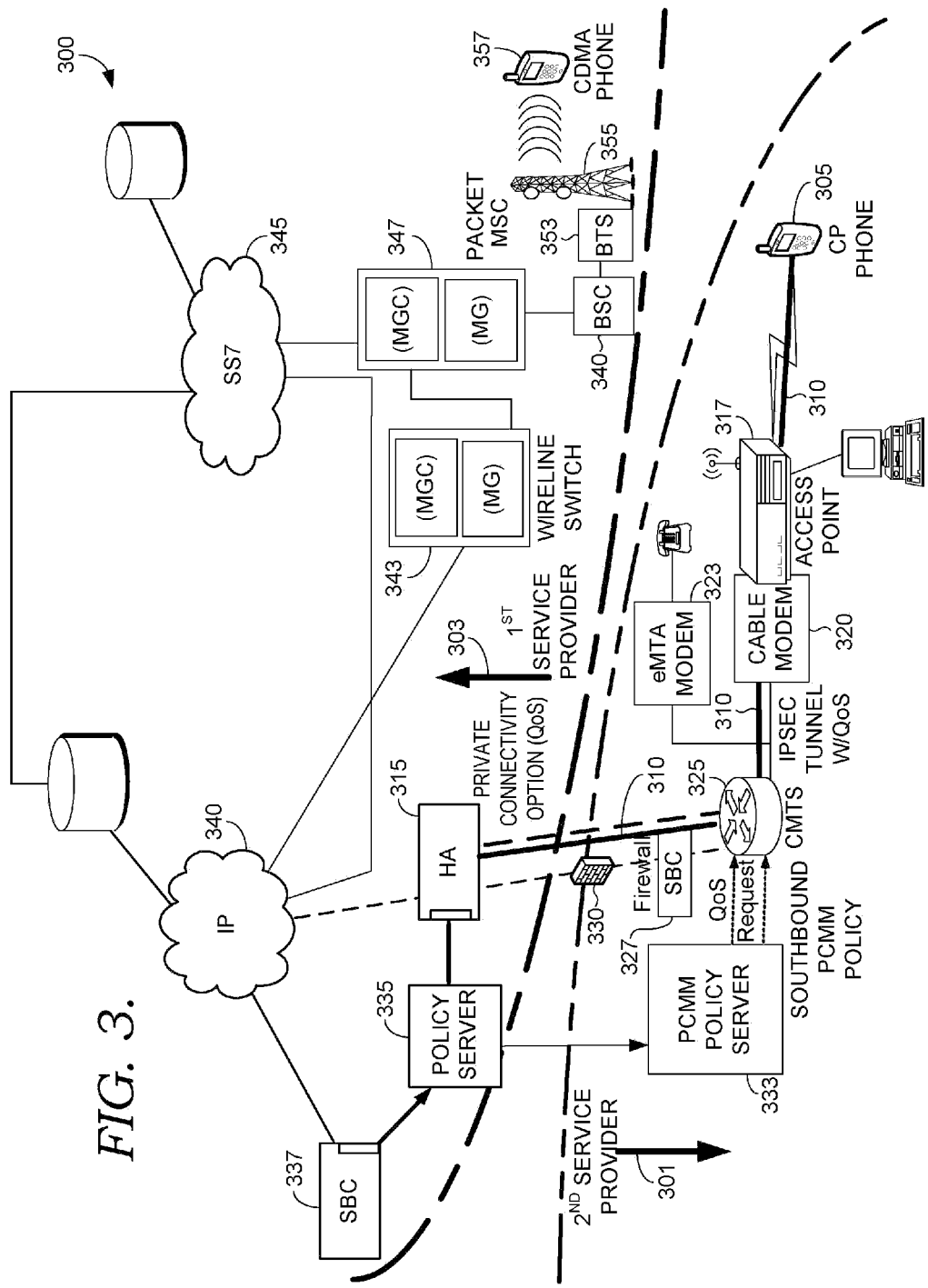
FIG. 3 is a block diagram of an exemplary operating environment illustrating an implementation of an embodiment of the present invention.

Turning now to FIG. 3, an exemplary operating environment 300 is shown for a data session originating in one service provider's network and terminating in another service provider's network. FIG. 3 illustrates an implementation of an embodiment of the present invention where QoS is provided over a secure data channel when one service provider does not have control nor have visibility into the other service provider's network. In FIG. 3, upon an initialization or turn on of CP 305, a secure data tunnel 310 is created to an HA 315. Along tunnel 310, various devices may be encountered, and an exemplary set is shown in FIG. 3. Some of the devices include an access point 317, a cable modem 320, an eMTA 323, a termination system 325, an SBC 327, and a firewall 330. These devices are exemplary and other devices and arrangements may be implemented with other embodiments of the present invention.

In FIG. 3, the devices are divided among two service providers 301 and 303. The illustration for two service providers is exemplary and more service providers may be involved in other embodiments of the present invention. With service provider 301, a PCMM policy server 333 is shown connected to termination device 325. PCMM policy server 333 is connected to another policy server 335 in service provider 333's network. During the creation of QoS across both service providers' networks, both policy servers communicate together to send and receive a set of policies that establish bandwidth requirements for tunnel 310. Although FIG. 3 shows two policy servers, an embodiment of the present invention may be implemented with one policy server 335 that connects to termination system 325. One should note that termination system 325 may vary according to the type of equipment implemented in the path for tunnel 310 and the types of services provided. In FIG. 3, termination system 325 is illustrated as a CMTS.

Policy server 335 connects to HA 315 and may also have a connection to SBC 337. Both HA 315 and SBC 337 have connections to the Internet or an IP network 340. IP network 340 can connect to a wireline switch 343 and a signaling network 345. Wireline switch 343 and signaling network 345 connect to MSC 347. Wireline switch 343 and MSC 347 are both switches and are examples of equipment in circuit-based technologies. In other embodiments, both switches could be combined into one switch. Furthermore, wireline switch 343 includes a media gateway feature that allows a conversion between circuit-based communications and packet-based communications.

MSC 347 has a connection to a based station controller (BSC) 350 which connects to a base transceiver station (BTS) 353. In an implementation of an embodiment of the present invention, MSC 347 connects to several base station controllers which have connections to several base transceiver stations. Continuing with FIG. 3, BTS 353 connects to tower 355 which communicates with phone 357. Phone 357 is an exemplary CDMA phone but other circuit-based wireless technologies may be implemented such as UMTS, TDMA, and GSM to name a few. In addition, different generations of wireless technologies may be implemented as well such as 2.5G, 3G, or 4G.

To further describe FIG. 3, CP 305 has the ability to communicate in multiple wireless networks. For example, CP 305 can operate in service provider 301's network using WiFi or other wireless packet communications. CP 305 can also operate in service provider 303's network. When CP 305 moves into service provider 303's network, CP 305 connects to tower 355 using CDMA or another circuit-based wireless technology. When CP 305 moves back into service provider 301's network, the above-described process is used to create secure data tunnels for the transfer of data packets. This enable secure communicates over open access networks such as WiFi.

Figure 4:
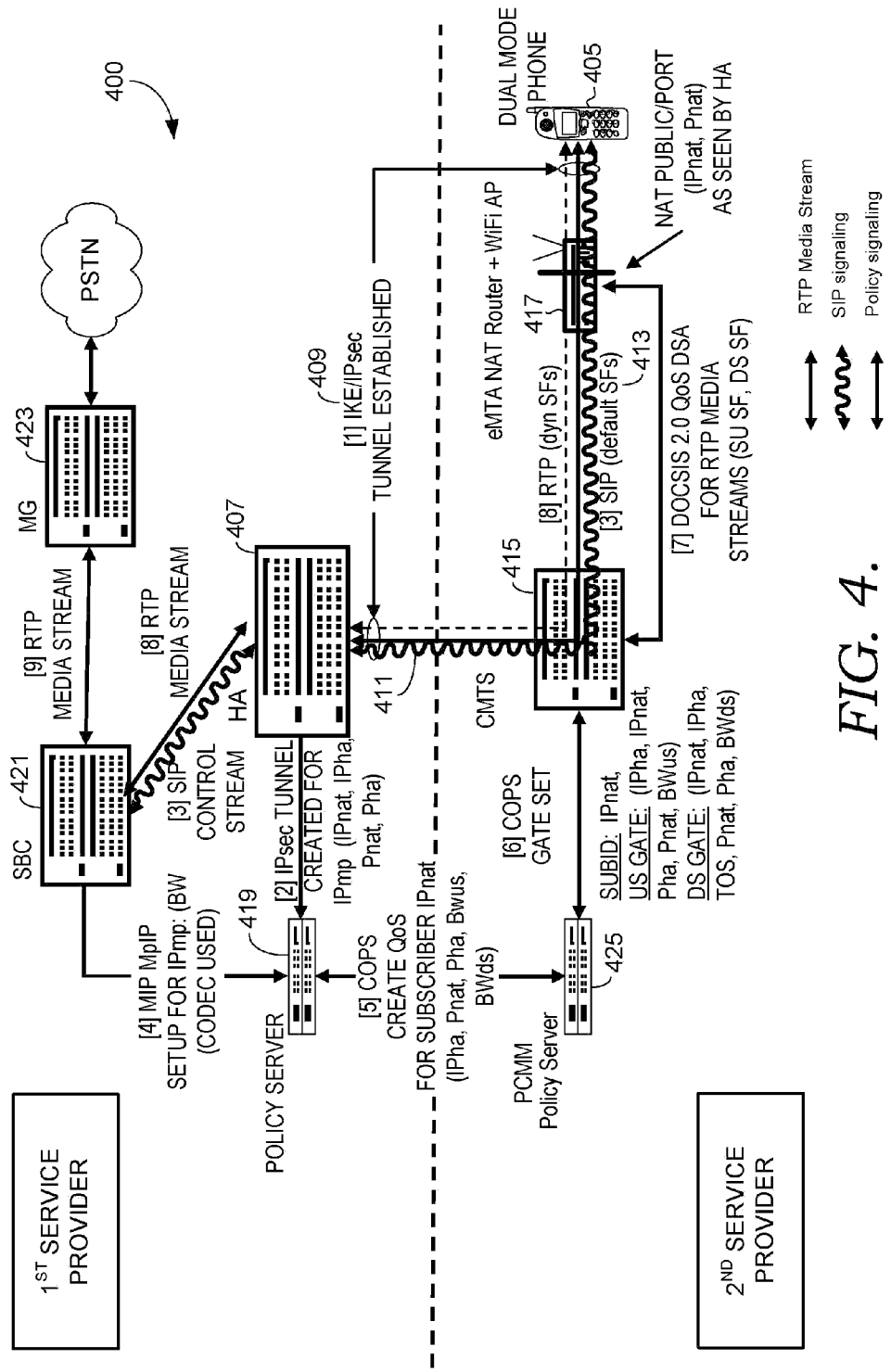
FIG. 4 is a block diagram of another exemplary operating environment illustrating exemplary components, signaling, and service flows implemented in an embodiment of the present invention.

In FIG. 4, another block diagram of an exemplary operating environment 400 is shown which may be described in the following scenario. Mobile phone 405 initiates an internet key exchange (IKE) with HA 407 to create an IPsec tunnel 409. IKE stream and SIP stream 411 are carried over the default session flows 413 between CMTS 415 and eMTA 417, which is a combined NAT Router and WiFi access point. The NAT router portion translates mobile phone 405's IPsec tunnel IP address and UDP port.

HA 407 extracts the inner and outer IP addresses and port information then sends this information to a policy server 419 via a radius interface. The outer IP address and outer port information is the IP address and port from the NAT router seen by HA 407. The inner IP address and inner port information is the IP address and port assigned by HA 407. HA 407 send IPsec tunnel 409's information to policy server 419 for mobile phone 405. This information can include the IP address assigned by the NAT router (417), the IP address assigned by HA 407, the port assigned by the NAT router, and the port assigned by HA 407.

Mobile phone 405 initiates a SIP session (411). Mobile phone 405 begins SIP session 411 with an SBC 421 by way of tunnel 409. The SIP call terminates at a media gateway (MG) 423 by way of IPsec tunnel 409 and SBC 421. SBC 421 identifies SIP session 411 and sends policy server 419 the inner IP address and codec information. The SIP call setup begins for a real-time transport protocol (RTP) media stream between mobile phone 405 and MG 423. SBC 421 sends an RTP media QoS request to policy server 419 for mobile phone 405 with bandwidth requirements.

Policy server 419 signals a PCMM policy server 425 with the upstream and downstream bandwidth requirements along with the specifics to identify tunnel 409. Policy server 419 sends a create QoS request to PCMM policy server 425. PCMM policy server 425 signals CMTS 415 with a bandwidth reservation request. PCMM policy server 425 sends common open policy service protocols gate set requests to CMTS 415, one for the upstream and another for the downstream. CMTS 415 establishes a dynamic service flow request with eMTA 417. CMTS 415 sends DOCSIS dynamic service add requests to eMTA 417 for the upstream and downstream service flows. RTP media stream service flows would now be active between CMTS 415 and eMTA 417. At this point, dynamic service flows are established with appropriate levels of QoS. RTP media stream begins between mobile phone 405 and MG 423 by way of IPsec tunnel 409 using dynamic service flows between CMTS 415 and eMTA 417.

Another embodiment of the present invention may be implemented whereby SBC 421 is not involved in establishing bandwidth requirements based on a trigger of a call or SIP session. In this case, QoS is established at the moment that IPsec tunnel 409 is created. Regardless of the underlying data session, QoS would be provided to IPsec tunnel 409. This static application of QoS to a secure data tunnel is different from the above described scenario where QoS is dynamically applied based on the data session. In the dynamic situation, although a secure data tunnel is established, QoS is not provided until a data session such as a telephone call, email delivery, or other activity is commenced within tunnel 409.

Continuing with FIG. 4, the scenario may continue with the tear down of a call which would release the application of QoS. At the moment of a termination of call from mobile phone 405 or another endpoint device, the SIP call teardown begins for the RTP media stream between mobile phone 405 and MG 423. SBC 421 notices the RTP stream termination and SBC 421 signal policy server 419. SBC 421 sends an RTP media QoS teardown request to policy server 419 for mobile phone 405 with new bandwidth requirements. Policy server 419 signals PCMM policy server 425 to terminate QoS reservation. Policy server 419 sends a delete QoS request to PCMM policy server 425 for mobile phone 405. PCMM policy server 425 sends a QoS release request to CMTS 415. PCMM policy server 425 sends common open policy service protocols gate delete requests to CMTS 415 for the upstream and the downstream.

CMTS 415 initiates a DOCSIS dynamic service delete request to eMTA 417 for the upstream dynamic service flow and the downstream dynamic service flow. RTP media stream service flows are terminated. The call termination is complete when the RTP media stream is removed between mobile phone 405 and MG 423.

As discussed above, the PCMM policy server, termination device, cable modem, and eMTA reserve bandwidth for the call or data session. The HA, SBC, and policy server trigger the application of QoS in the DOCSIS network. It shall be noted that other networks may be implemented for the present invention and that the scenarios are provided to illustrate an exemplary implementation of the present invention. It is also noted that variations on the scenarios may be implemented such as the removal of the SBC to provide a continuous or static QoS on an IPsec tunnel. Furthermore, PCMM policy server 425 may be removed from the network whereby a communication connection is made between policy server 419 and CMTS 415 to reserve and implement bandwidth requirements for QoS.

Figure 5:
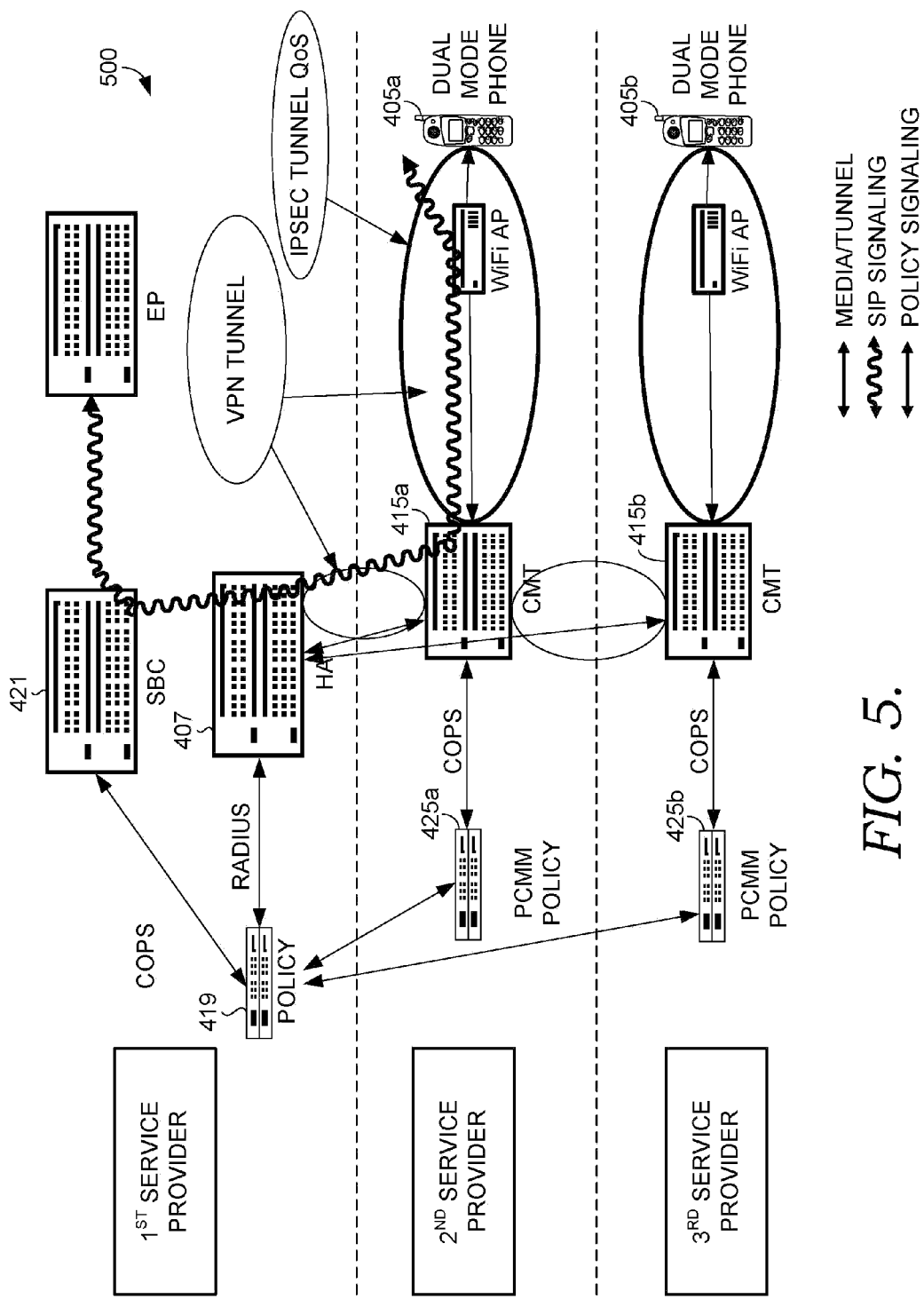
FIG. 5 is a block diagram of an exemplary operating environment illustrating multiple service providers operating in an implementation of an embodiment of the present invention.

In FIG. 5, another illustration is provided in 500 to show the interaction of more than two service providers. In FIG. 5, three service providers are shown to illustrate an implementation of an embodiment of the present invention.

In reference to FIGS. 1-5, an embodiment of the present invention may be implemented that provides varying levels of QoS. A set of policies may be created for the policy servers whereby an indicator is provided by the SBC or the HA. When the policy server receives a particular indicator or indicators, the set of policies operate to create bandwidth requirements for the one or more indicators. From this point, the bandwidth requirement are delivered to other policy servers or to termination systems like the CMTS to set or reserve bandwidth for the data session. Different types of data sessions may trigger different types of indicators. Each different type of indicator may operate different policies in the policy server to provide different bandwidth requirements. For example, a voice call may have a first indicator that is received by the SBC or the HA. Either the SBC or the HA sends the first indicator to the policy server along with other data discussed above. When the policy server receives the first indicator and the other data, a first policy set operates to create upstream and downstream bandwidth requirements that can reduce jitter and delay for the voice call. The requirements are sent to the CMTS or another policy server. Likewise, an email sent from mobile 405 may have a second indicator that is received by the SBC or the HA. Because email is less sensitive to jitter and delay, the policy server operates a set of policies that provide a much smaller set of bandwidth requirements for the data session than for the voice call. As such, different indicators can be established for different types of data sessions such as voice, email, video, etc. The indicators can be established by a software client in the endpoint device such as the mobile phone such that the indicators are received by a monitoring device such as the SBC or the HA.

Again, with reference to FIGS. 1-5, another embodiment of the present invention may be implemented whereby multiple data sessions may operate simultaneously in the same or different secure data tunnels. Each data session may have a unique QoS established for it either by way of indicators as described above or based on other factors such as unique service set identifiers (SSIDs). For example, a video and an email session may operate from mobile 405. Based on the information discussed above, the video can operate as an application with a unique SSID and the email can operate in another application with another unique SSID. Both applications may operate in the same secure data tunnel or in different secure data tunnels. In either case, the applications operate simultaneously. Based on the unique SSID, bandwidth requirements can be established for each application. Following the discussion above, bandwidths can be established and removed dynamically for each application using the SSID as a differentiator. One ordinarily skilled in the art understands that the SSID can be used by the SBC, HA, policy server, or modem to establish unique bandwidth requirements to give rise to unique bandwidths for the different applications which are different data sessions. Furthermore, mobile phone 405 can establish and distinguish the video and email applications by virtue of the unique SSIDs attributed to each application.

The various embodiments may be implemented with PCMM. In the PCMM specification, the MSO hosts a policy server on a network. In addition, an application manager (AM) is developed for each application that is to be delivered by PCMM services. The MSO can host a content provider's AM on its network. For example, an SBC can act as an AM.

The CMTS provides data connectivity and complimentary functionality to CMs over an HFC access network. It also provides connectivity to wide area networks. The CMTS provides connectivity to the HA in some network configurations. The CMTS is located at the cable television system headend or distribution hub but may also be located elsewhere. A CMTS aggregates and routes IP traffic to/from eMTAs. A single CMTS can aggregate the IP services and VOP traffic for several thousand eMTA devices. The CMTS is also capable of reserving bandwidth and performing Call Admission Control (CAC) functions on dedicated voice RF channels. The CMTS provides the QoS to the CM, based on policy.

Usually, without a secure data tunnel, the CMTS classifies each packet arriving from the network interface, and assigns to it a QoS level. It enforces policy on the Type of Service (TOS) field, for packets received from the network. This capability supports application level QoS. The CMTS forwards upstream packets to the backbone network according to the assigned QoS, and signals and reserves backbone QoS for service reservation. With the secure data tunnel implemented, the ability of the CMTS to inspect and classify packets is disabled. However, other functionality of the CMTS remains.

Figure 6:
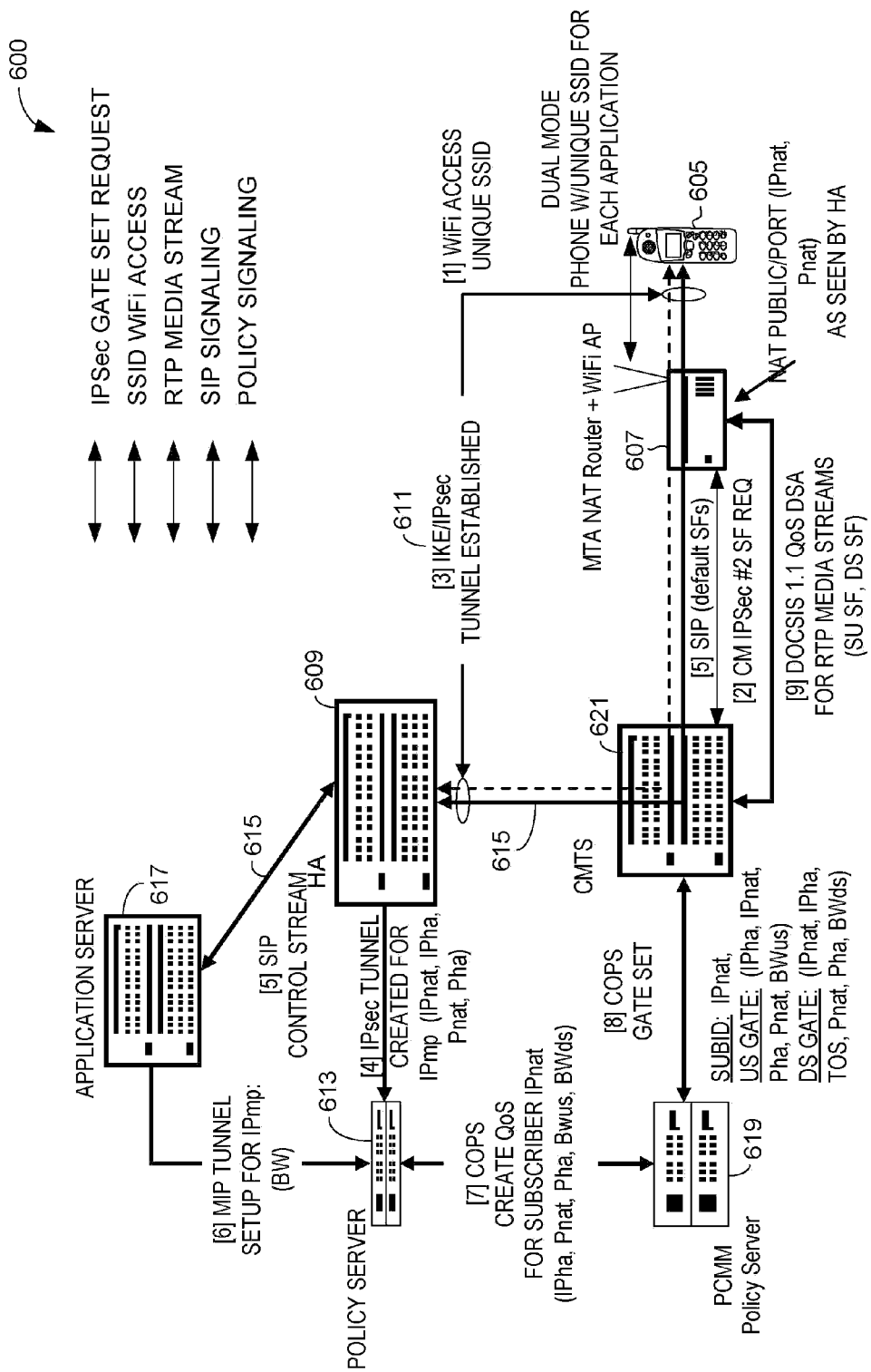
FIG. 6 is a block diagram of yet another exemplary operating environment illustrating exemplary components, signaling, and service flows implemented in an embodiment of the present invention.

In FIG. 6, a block diagram of an exemplary operating environment 600 is shown which may be described in the following scenario. Mobile phone 605 accesses eMTA 607 using a unique SSID. A cable modem embedded in eMTA 607 requests a packet cable service flow. Mobile phone 605 initiates an IKE with HA 609 to create a secure data tunnel 611. HA 609 extracts the inner and outer IP addresses and port information then sends the inner and outer IP addresses and port information to a policy server 613.

Mobile phone 605 also initiates a session such as a SIP session 615. Session 615 terminates at an application server 617 through tunnel 611. Application server 617 identifies session 615 and sends the inner IP address and bandwidth requirements to policy server 613. With the bandwidth requirements, application server 617 send an RTP media QoS request. Policy server 613 signals a policy server 619 with the upstream and downstream bandwidth requirements along with the specifics to identify tunnel 611. Policy server 619 signals CMTS 621 with a bandwidth reservation request. CMTS 621 dynamically changes the existing service flows with eMTA 607. The service flows are established with an appropriate level of QoS for the application RTP stream.

Figure 7:
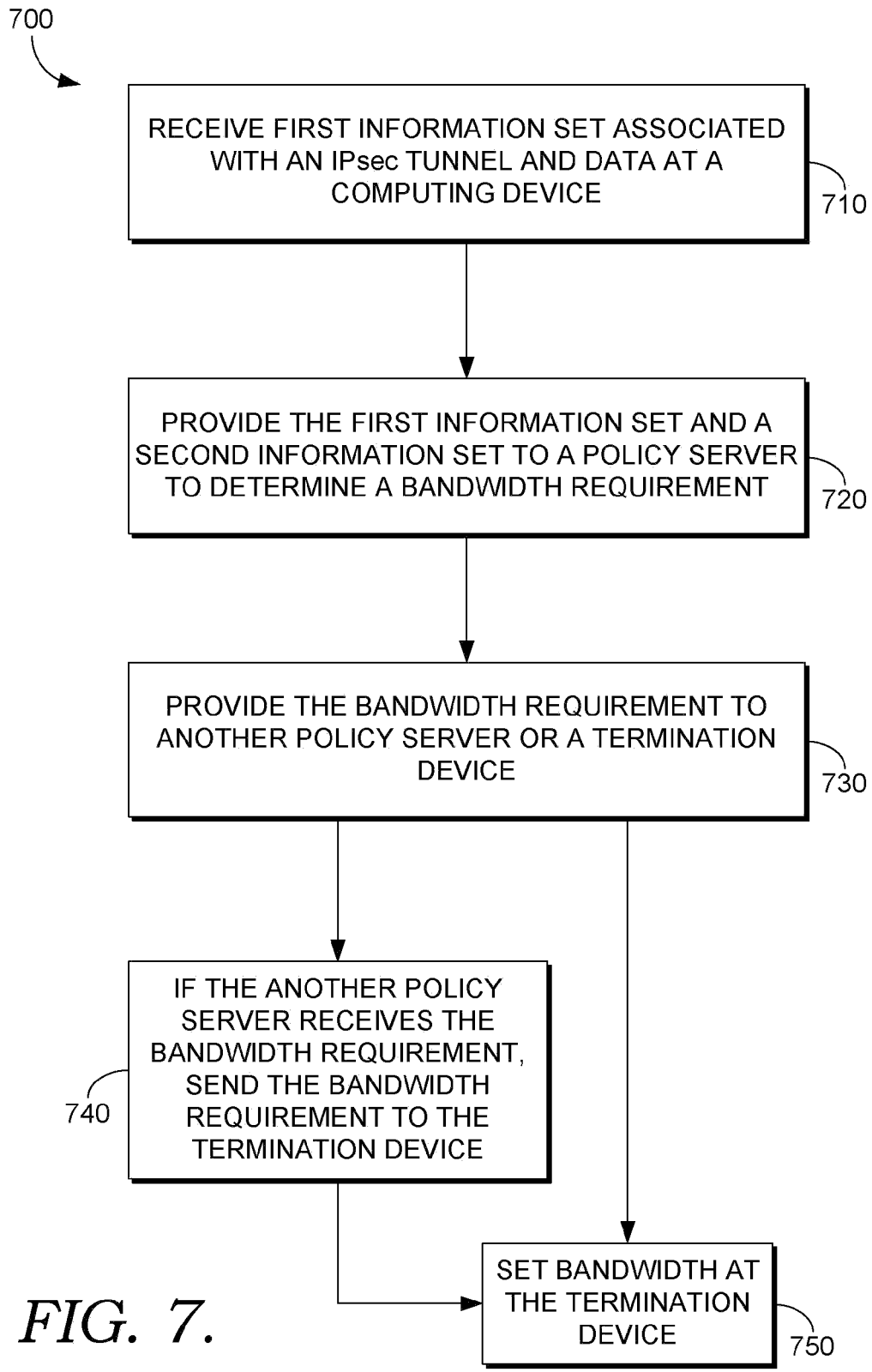
FIG. 7 is a flowchart of an exemplary process for providing QoS to data in a secure data channel.

Turning now to FIG. 7, a process for providing QoS to data in a secure data channel is shown in a method 700. In method 700, in a step 710, a first information set is received at a computing device associated with an IPsec tunnel. In a step 720, the first information set and a second information set are provided to a policy server to determine a bandwidth requirement. In a step 730, the bandwidth requirement is provided to another policy server or a termination device. If the another policy server receives the bandwidth requirement, the another policy server sends the bandwidth requirement to the termination device as shown in a step 740. In a step 750, the termination device sets the bandwidth for the secure data channel.

Figure 8:
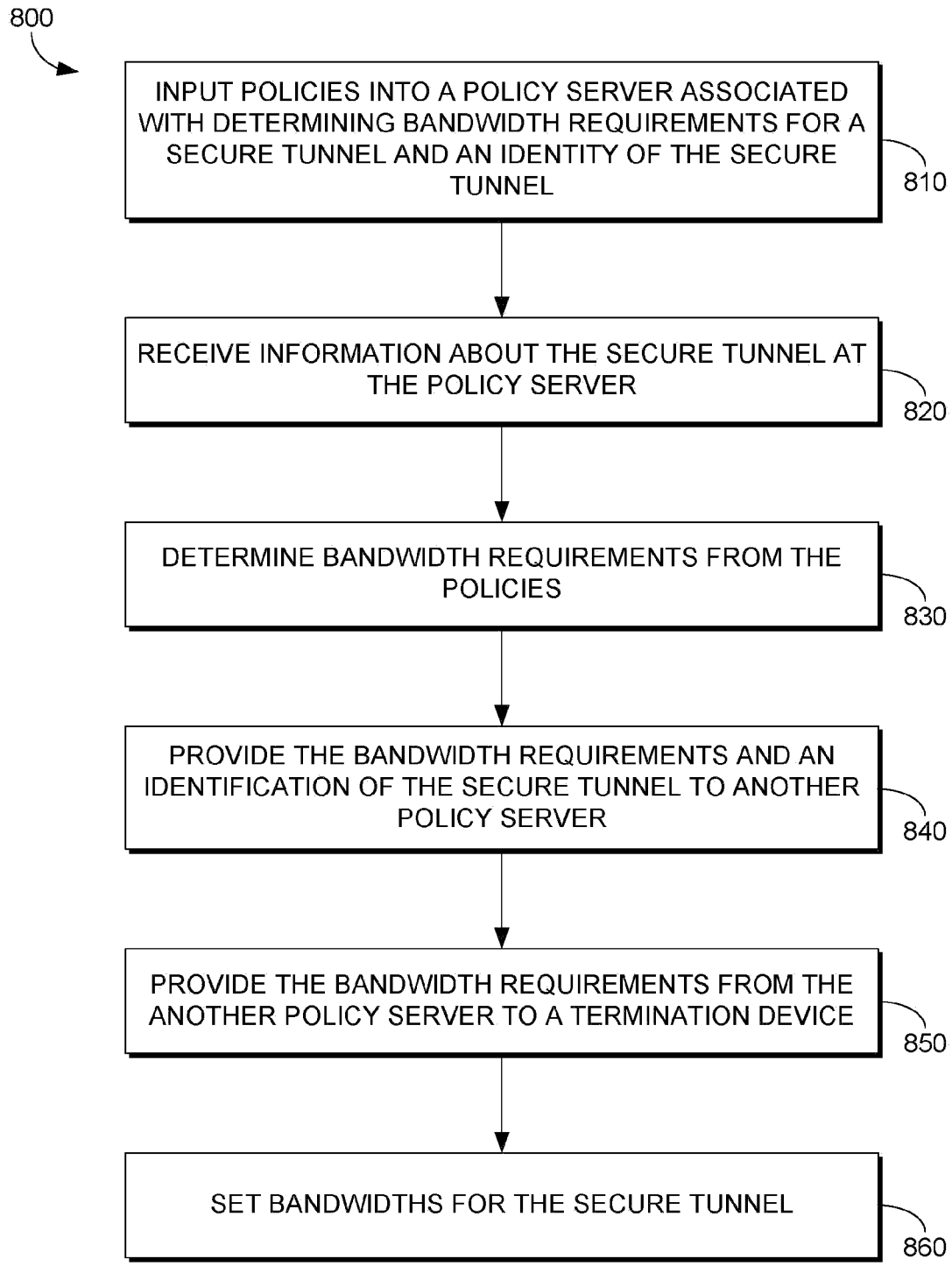
FIG. 8 is a flowchart of an exemplary process for setting a QoS without classifying a data packet.

In FIG. 8, a process for setting a QoS without classifying a data packet is shown in a method 800. In a step 810, policies are input into policy server associated with determining bandwidth requirements for a secure tunnel and associated with identifying the secure tunnel. In a step 820, information is received about the secure tunnel at the policy server. In a step 830, policies are executed that determine the bandwidth requirements. In a step 840, the bandwidth requirement and an identification of the secure tunnel are provided to another policy server. In a step 850, the bandwidth requirements from the another policy server are provided to a termination device. In a step 860, the termination device sets the bandwidths for the secure tunnel.

Figure 9:
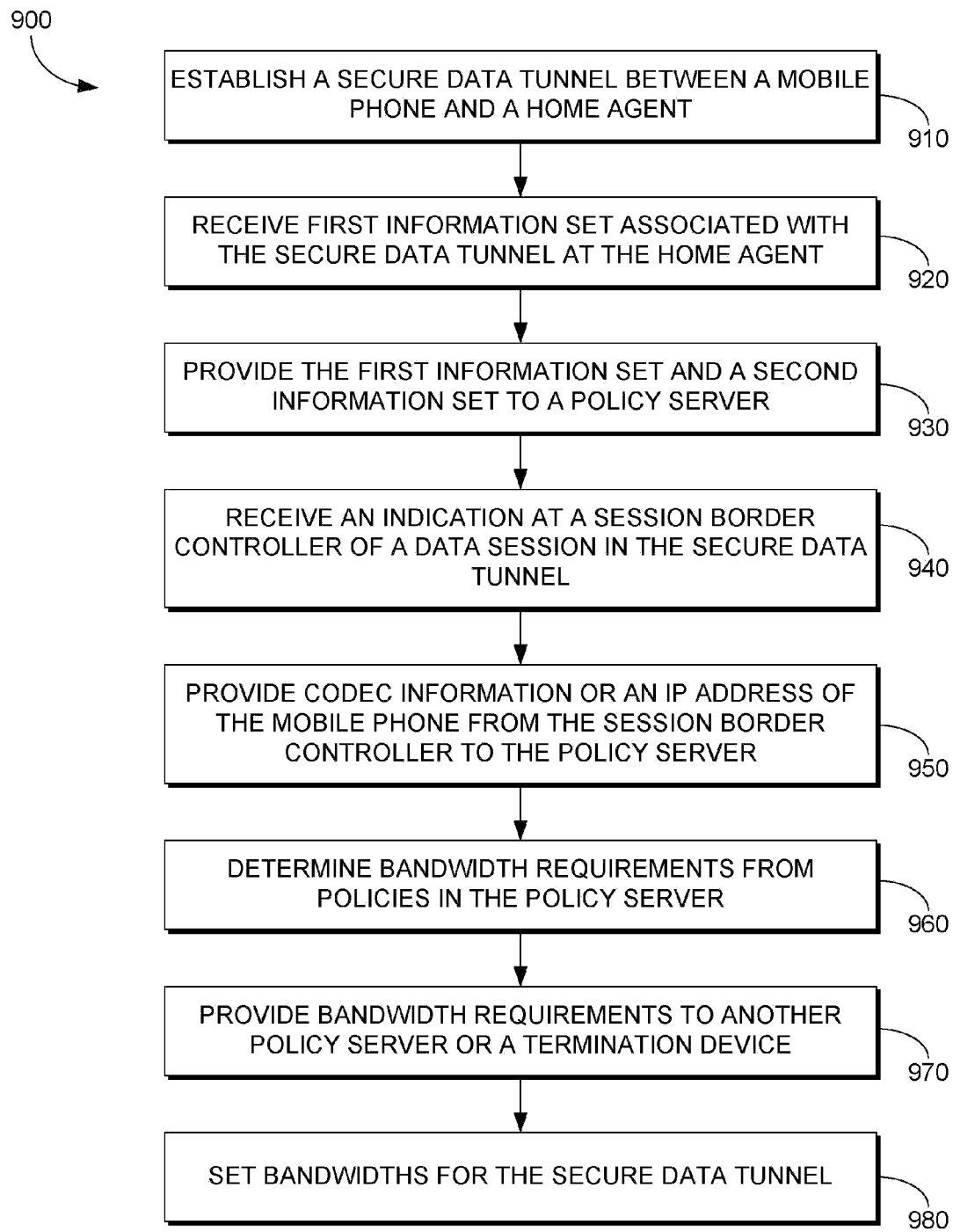
FIG. 9 is a flowchart of an exemplary process for dynamically providing QoS to a data session in a secure data channel.

In FIG. 9, a process for dynamically providing QoS to a data session in a secure data channel is shown in a method 900. In a step 910, a secure data tunnel is established between a mobile phone and a home agent. In a step 920, a first information set associated with the secure data tunnel is received at the home agent. In a step 930, the first information set and a second information set are provided to a policy server. In a step 940, an indication is received at a session border controller of a data session in the secure data tunnel. In a step 950, the session border controller provides at least codec information or an IP address of the mobile phone to the policy server. In a step 960, bandwidth requirements are determined from policies in the policy server. In a step 970, the policy server provides the bandwidth requirements to another policy server or a termination device. In a step 980, the termination device sets the bandwidths for the secure data tunnel.

Figure 10:
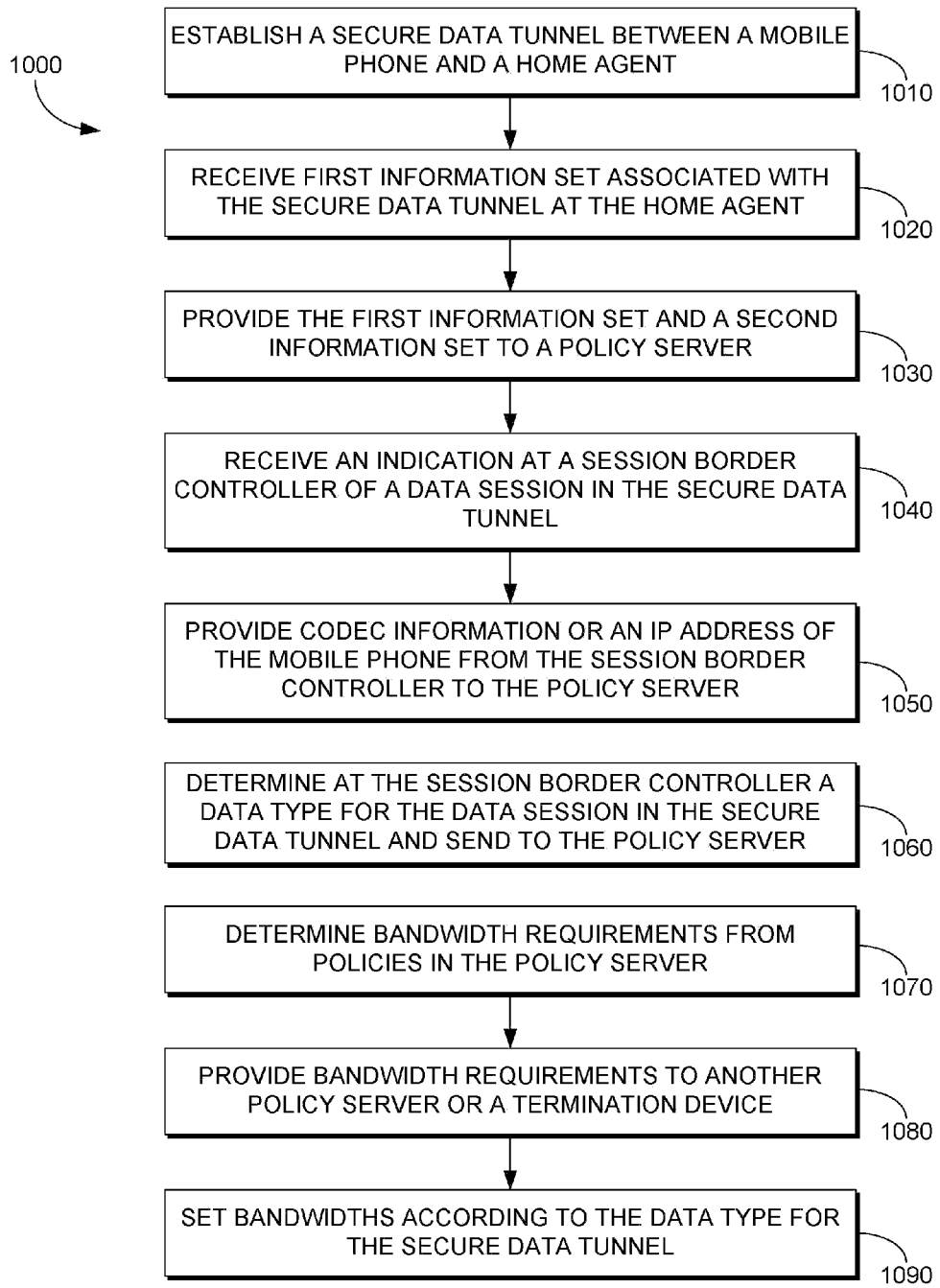
FIG. 10 is a flowchart of an exemplary process for providing different levels of QoS to different data sessions in a secure data channel.

In FIG. 10, a process for providing different levels of QoS to different data sessions is shown in a method 1000. Steps 1010-1050 are similar to steps 910-950 in FIG. 9. In a step 1060, the session border controller determines a data type for the data session in the secure data tunnel. After this determination, the information is sent to the policy server. The idea here is that the policy server can determine specific bandwidth requirements using the data type and other information. The bandwidth requirements may change when the data type changes. Steps 1070-1080 are similar to step 960-970 in FIG. 9. In a step 1090, the termination device sets the bandwidths for the secure data tunnel according to the data type.

Figure 11:
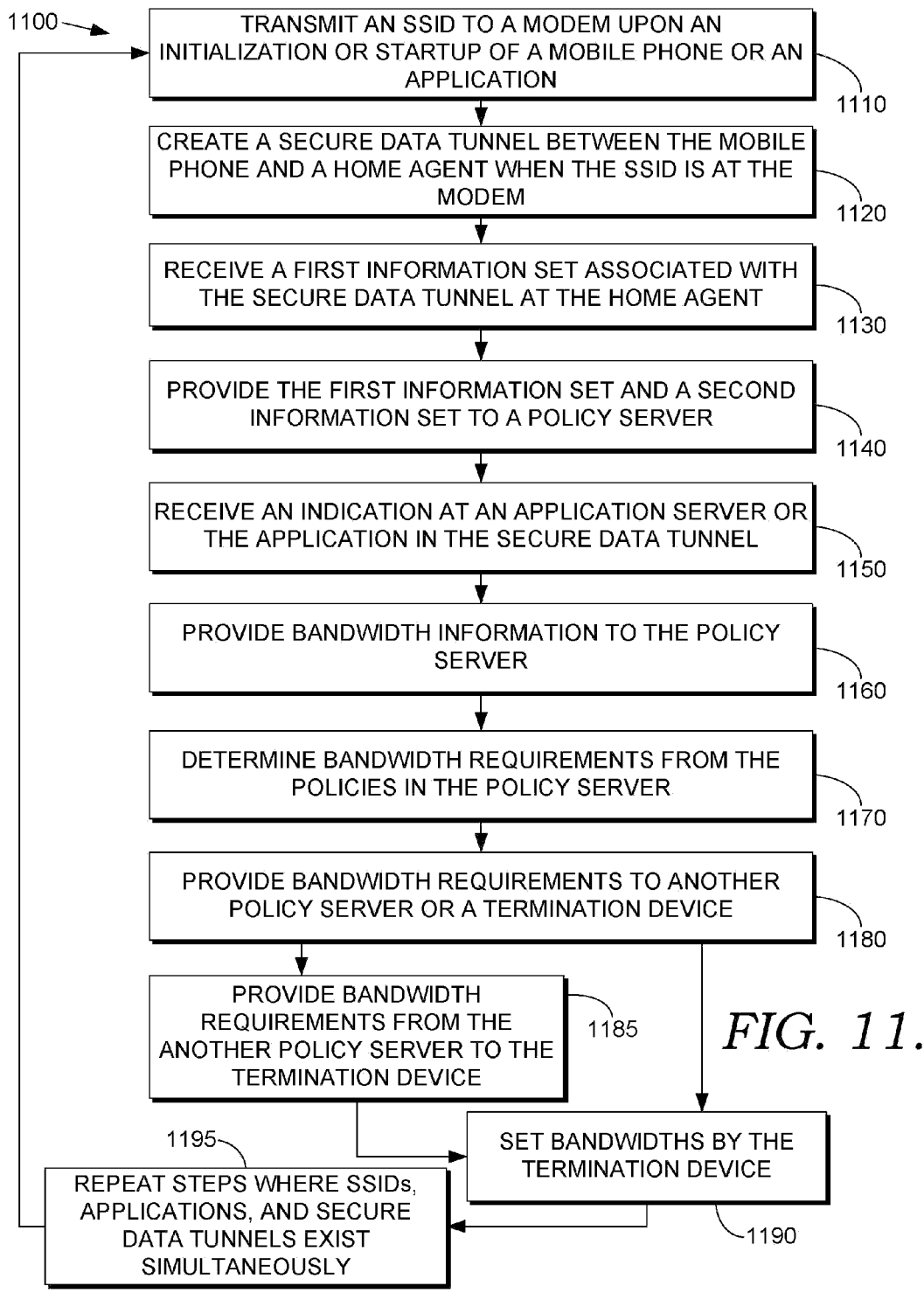
FIG. 11 is a flowchart of an exemplary process for dynamically providing QoS to applications in secure data channels.

In FIG. 11, a process for dynamically providing QoS to applications in secure data channels are shown in a method 1100. In a step 1110, an SSID is transmitted to a modem upon an initialization or startup of a mobile phone or an application. In a step 1120, a secure data channel is created between the mobile phone and a home agent when the SSID is at the modem. In a step 1130, a first information set associated with the secure data tunnel is received at the home agent. In a step 1140, the first information set and a second information set are provided to a policy server. In a step 1150, an indication is received at an application server of the application in the secure data tunnel. In a step 1160, bandwidth information is provided to the policy server. In a step 1170, policies in the policy server determine bandwidth requirements. In a step 1180, the policy server provides the bandwidth requirements to another policy server or a termination device. In a step 1185 the another policy server provides the bandwidth requirements to the termination device if necessary. In a step 1190, the termination device sets the bandwidths. In a step 1195, the steps in method 1100 are repeated when additional SSIDs are encountered such that the SSIDs, applications, and the secure data tunnels exist simultaneously.

It is noted that throughout the various methods discussed above, there are steps that disclose one policy server delivering a set of policies, bandwidth requirements, or other information to another policy server. These steps are provided to illustrate the situation where multiple service providers interface with each other to provide an end-to-end call or data session. Each service provider can have a policy server that communicates with the other service provider's policy server.

The prior discussion is only for illustrative purposes to convey exemplary embodiments. The steps discussed in FIGS. 7-11 may be executed without regards to order. Some steps may be omitted and some steps may be executed at a different time than shown. For example, step 750 may be executed before step 740. Step 940 may be executed before step 920. The point here is to convey that the figures are merely exemplary for the embodiments of the present invention and that other embodiments may be implemented for the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer system having a processor and a memory, the computer system operable to execute a method for dynamically providing different levels of QoS to different data sessions in a secure data tunnel in one or more networks, comprising:

establishing the secure data tunnel between an endpoint device and a home agent;

receiving, at the home agent, a first information set associated with the secure data tunnel;

determining at the home agent a data type for a data session in the secure data tunnel;

providing the first information set, a second information set, and the data type to a policy server;

receiving an indication at a session border controller of the data session in the secure data tunnel wherein the session border controller provides at least one of a codec information and an IP address of the endpoint device to the policy server;

with the first information set, the second information set, the data type, and at least one of the codec information and the IP address of the endpoint device, determining one or more bandwidth requirements from one or more policies based in the policy server; and providing the one or more bandwidth requirements to at least one of another policy server and a termination device wherein the another policy server communicates with the termination device when the another policy server receives the one or more bandwidth requirements wherein the termination device establishes one or more bandwidths for the secure data tunnel.

2. The system of claim 1, further comprising receiving another indication at the session border controller that the data session is no longer in the secure data tunnel wherein the session border controller provides a QoS teardown request to the policy server.

3. The system of claim 2, further comprising providing from the policy server to at least one of the another policy server and the termination device a delete request wherein the delete request removes the allocated one or more bandwidths for the secure data tunnel.

4. The system of claim 1, wherein determining at the home agent the data type comprises reading one or more information in a header of a set of packets in the data session.

5. The system of claim 4, wherein the one or more information in the header are established by at least one of an endpoint device and a software client in the endpoint device.

6. The system of claim 1, wherein the data session is selected from a group including a telephone call, an email, a video, and an internet browser session.

7. The system of claim 6, wherein the telephone call is selected from a group including data packets and an RTP stream.

8. The system of claim 1, wherein the secure data tunnel is selected from a group including a VPN.

9. The system of claim 8, wherein the VPN is selected from a group including IPsec, SSL, TLS, and L2TP.

10. The system of claim 1, wherein the first information set is selected from a group including an IP address assigned by a NAT router and a port assigned by the NAT router.

11. The system of claim 10, wherein the second information set is selected from a group including an IP address assigned by the home agent and a port assigned by the home agent.

12. The system of claim 11, wherein the endpoint device is selected from a group including a mobile phone, a PDA, and a laptop computer.

13. The system of claim 1, wherein receiving the indication comprises receiving at least one of a SIP message, an RTP message, and an H.323 message.

14. The system of claim 1, wherein determining one or more bandwidth requirements comprises determining at least one of an upstream bandwidth requirement and a downstream bandwidth requirement.

15. The system of claim 1, wherein the termination device is selected from a group including a CMTS.

16. A computer system having a processor and a memory, the computer system operable to execute a method for dynamically providing different levels of QoS to different data sessions in a secure data tunnel in one or more networks, comprising:
    establishing the secure data tunnel between an endpoint device and a home agent;
    receiving, at the home agent, a first information set associated with the secure data tunnel;
    providing the first information set and a second information set to a policy server;
    receiving an indication at a session border controller of a data session in the secure data tunnel wherein the session border controller provides at least one of a codec information and an IP address of the endpoint device to the policy server;
    determining at the session border controller a data type for the data session in the secure data tunnel;
    with the first information set, the second information set, the data type, and at least one of the codec information and the IP address of the endpoint device, determining one or more bandwidth requirements from one or more policies based in the policy server; and
    providing the one or more bandwidth requirements to at least one of another policy server and a termination device wherein the another policy server communicates with the termination device when the another policy server receives the one or more bandwidth requirements wherein the termination device establishes one or more bandwidths for the secure data tunnel.

17. The system of claim 16, further comprising receiving another indication at the session border controller that the data session is no longer in the secure data tunnel wherein the session border controller provides a QoS teardown request to the policy server.

18. The system of claim 17, further comprising providing from the policy server to at least one of the another policy server and the termination device a delete report wherein the delete request removes the allocated one or more bandwidths for the secure data tunnel.

19. The system of claim 16, wherein determining at the session border controller the data type comprises reading one or more information in a header of a set of packets in the data session.

20. The system of claim 19, wherein the one or more information in the header are established by at least one of an endpoint device and a software client in the endpoint device.

21. The system of claim 16, wherein the data session is selected from a group including a telephone call an email, a video, and an internet browser session.

22. The system of claim 21, wherein the telephone call is selected from a group including data packets and an RTP stream.

23. The system of claim 16, wherein the secure data tunnel is selected from a group including a VPN.

24. The system of claim 23, wherein the VPN is selected from a group including IPsec, SSL, TLS, and L2TP.

25. The system of claim 16, wherein the first information set is selected from a group including an IP address assigned by a NAT router and a port assigned by the NAT router.

26. The system of claim 25, wherein the second information set is selected from a group including an IP address assigned by the home agent and a port assigned by the home agent.

27. The system of claim 26, wherein the endpoint device is selected from a group including a mobile phone, a PDA, and a laptop computer.

28. The system of claim 16, wherein receiving the indication comprises receiving at least one of a SIP message, an RTP message, and an H.323 message.

29. The system of claim 16, wherein determining one or more bandwidth requirements comprises determining at least one of an upstream bandwidth requirement and a downstream bandwidth requirement.

30. The system of claim 16, wherein the termination device is selected from a group including a CMTS.

31. A system for dynamically providing different levels of QoS to different data sessions in a VPN in one or more networks, comprising:
    a home agent, a session border controller, a policy server, and at least one of another policy server and a termination device operable together in the one or more networks;

the home agent operable to receive a first data set associated with the data session in the VPN, and to provide to the policy server at least one of the first data set and a second data set associated with the home agent;

the session border controller operable to receive an indication of the data session and to provide at least one of a codec information and an IP address associated with an endpoint device initiating the data session to the policy server;

either the home agent operable to determine a data type for the data session and to provide the data type to the policy server, or the session border controller operable to determine the data type for the data session and to provide the data type to the policy server;

the policy server operable to receive at least one of the first data set, the second data set, and the data type, to monitor for the codec information and the IP address from the session border controller, and to provide at least one of an upstream bandwidth requirement and a downstream bandwidth requirement to at least one of the another policy server and the termination device wherein upon a receipt of the codec information and the IP address, the policy server correlates the codec information, the IP address, the data type, the first data set, and the second data set for the VPN and the data session; and either the another policy server operable to receive the at least one of the upstream bandwidth requirement and the downstream bandwidth requirement, and to communicate the at least one of the upstream bandwidth requirement and the downstream bandwidth requirement to the termination device, or the termination device operable to receive the at least one of the upstream bandwidth requirement and the downstream bandwidth requirement.

32. The system of claim 31, wherein the data type is selected from a group including one or more information in a header of a set of packets in the data session.

33. The system of claim 32, wherein the one or more information in the header are established by at least one of an endpoint device and a software client in the endpoint device.

34. The system of claim 31, further comprising the termination device operable to establish at least one of an upstream bandwidth and a downstream bandwidth for the data session in the VPN.

35. The system of claim 31, wherein the termination device is selected from a group including a CMTS.

36. The system of claim 31, wherein the first data set is selected from a group including an IP address assigned by a NAT router and a port assigned by the NAT router.

37. The system of claim 31, wherein the second data set is selected from a group including an IP address assigned by the home agent and a port assigned by the home agent.

38. The system of claim 31, wherein the VPN is selected from a group including IPsec, SSL, TLS, and L2TP.

39. The system of claim 31, wherein the upstream bandwidth comprises a data path with a data flow from the endpoint device to the home agent and the downstream bandwidth comprises the data path with the data flow from the home agent to the endpoint device.

* * * * *